United States Patent
Yoshida et al.

(10) Patent No.: US 6,420,038 B2
(45) Date of Patent: Jul. 16, 2002

(54) LIQUID SILICONE RUBBER COMPOSITION FOR FIXING ROLLS AND FLUOROCARBON RESIN-COVERED FIXING ROLL

(75) Inventors: Hiroaki Yoshida; Yutaka Oka; Yuichi Tsuji, all of Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/738,153

(22) Filed: Dec. 15, 2000

(30) Foreign Application Priority Data

Dec. 22, 1999 (JP) ............................................. 11-364908

(51) Int. Cl.⁷ ............................................... B32B 27/08
(52) U.S. Cl. .................... 428/447; 428/36.9; 428/36.91
(58) Field of Search ............................... 428/215, 36.9, 428/36.91, 213, 421, 448, 450; 523/435, 443; 524/493, 588, 594, 600; 525/431, 476, 474, 477

(56) References Cited

U.S. PATENT DOCUMENTS

| | | | |
|---|---|---|---|
| 4,719,130 A | | 1/1988 | Shimizu et al. ............. 427/380 |
| 5,691,401 A | * | 11/1997 | Morita et al. ................ 523/435 |
| 5,756,598 A | * | 5/1998 | Chung et al. ................ 525/478 |
| 6,111,221 A | | 8/2000 | Miyakoshi et al. ......... 219/216 |

FOREIGN PATENT DOCUMENTS

| | | | |
|---|---|---|---|
| EP | 0 798 343 A2 | 1/1997 | ........... C08L/83/04 |
| JP | 53-74436 | 6/1978 | |
| JP | 57-89785 | 11/1980 | |
| JP | 59-52269 | 3/1984 | |
| JP | 59-74578 | 4/1984 | |

\* cited by examiner

*Primary Examiner*—Robert Dawson
*Assistant Examiner*—Christopher M Keehan
(74) *Attorney, Agent, or Firm*—Jennifer S. Warren; Jim L. De Cesare

(57) ABSTRACT

A liquid silicone rubber composition for fixing rolls comprising: (A) a diorganopolysiloxane which has at least two silicon-bonded alkenyl groups in each molecule and is liquid at room temperature, (B) an inorganic filler, (C) an organohydrogenpolysiloxane having at least two silicon-bonded hydrogen atoms in each molecule, (D) a platinum catalyst, and (E) a particulate hydroxide or oxide of an alkali metal or a particulate hydroxide or oxide of an alkaline earth metal; and a fluorocarbon resin-covered fixing roll produced by providing a fluorocarbon resin layer on the peripheral surface of a roll shaft across a silicone rubber layer, wherein said silicone rubber layer is produced by curing the above-mentioned liquid silicone rubber composition.

4 Claims, No Drawings

LIQUID SILICONE RUBBER COMPOSITION FOR FIXING ROLLS AND FLUOROCARBON RESIN-COVERED FIXING ROLL

FIELD OF THE INVENTION

The present invention relates to a silicone rubber composition for fixing rolls used in copier machines, printers, fax machines, etc. and to a fluorocarbon resin-covered fixing roll. More specifically the present invention relates to a liquid silicone rubber composition for fixing rolls capable of forming silicone rubber of superior durability and hardness stability under high-temperature conditions and which exhibits practically no decrease in hardness after high-temperature treatment, and to a fluorocarbon resin-covered fixing roll of superior hardness stability and reliability during use.

BACKGROUND OF THE INVENTION

Fixing rolls produced by forming a low-hardness silicone rubber layer over the peripheral surface of a metal roll shaft and then coating this external layer with a fluorocarbon resin are called fluorocarbon resin-covered fixing rolls. They are widely used in electrophotographic copiers, printers, facsimile machines, etc. (refer to Japanese Publication No. Sho 53(1978)-74436, Japanese Publication No. Sho 57(1982)-89785, Japanese Publication No. Sho 59(1984)-74578, and Japanese Publication No. Sho 59(1984)-52269). Superior heat resistance is required of this type of fluorocarbon resin-covered fixing rolls because they are used for fixing toner at high temperatures in excess of 200° C. Because the silicone rubber of the underlayer portion is shielded from contact with the air by the fluorocarbon resin coating, this tends to cause depolymerization, brings about a decrease in hardness, generates non-uniformity in hardness, and other problems. In addition, when the process of providing a coating of fluorocarbon resin on the surface of a roll is based on methods involving application of a fluorocarbon resin latex and baking at a high temperature, the silicone rubber of the underlayer undergoes softening and degradation because during the high temperature baking step of about 220~350° C. When this type of silicone rubber is employed for fluorocarbon resin-covered fixing rolls, during paper-passing durability testing, toner residue adheres to the surface of the roll, or creasing develops in the fluorine material layer on the surface of the roll.

As a result of in-depth investigations directed to eliminating the problems of the above-described prior art, the authors of the present invention found that a liquid silicone rubber composition produced by the addition of a particulate hydroxide or oxide of an alkali metal or a particulate hydroxide or oxide of an alkaline earth metal is superior in heat resistance, and especially heat stability in the absence of air due to a fluorocarbon resin coating. It is an object of the present invention to provide a silicone rubber composition for fixing rolls capable of forming silicone rubber of superior durability and hardness stability that exhibits practically no decrease in hardness after high-temperature treatment in a fluorocarbon resin coating step, and to provide a fixing roll of superior hardness stability and reliability during use.

SUMMARY OF THE INVENTION

A liquid silicone rubber composition for fixing rolls comprising (A) 100 parts by weight of a diorganopolysiloxane which has at least two silicon-bonded alkenyl groups in each molecule and is liquid at room temperature, (B) 5~300 parts by weight of an inorganic filler, (C) an organohydrogenpolysiloxane having at least two silicon-bonded hydrogen atoms in each molecule in a quantity that affords a value of from 0.3:1 to 5:1 for the ratio of the number of moles of silicon-bonded hydrogen atoms in the present component and silicon-bonded alkenyl groups in component (A), (D) a platinum catalyst in a quantity that affords a value of from 0.1 part by weight to 500 parts by weight of platinum metal atoms per 1,000,000 parts by weight of component (A), and (E) 0.01~10 parts by weight of a particulate hydroxide or oxide of an alkali metal, or a particulate hydroxide or oxide of an alkaline earth metal.

DESCRIPTION OF THE INVENTION

The present invention is a liquid silicone rubber composition for fixing rolls comprising (A) 100 parts by weight of a diorganopolysiloxane which has at least two silicon-bonded alkenyl groups in each molecule and is liquid at room temperature, (B) 5~300 parts by weight of an inorganic filler, (C) an organohydrogenpolysiloxane having at least two silicon-bonded hydrogen atoms in each molecule in a quantity that affords a value of from 0.3:1 to 5:1 for the ratio of the number of moles of silicon-bonded hydrogen atoms in the present component and silicon-bonded alkenyl groups in component (A), (D) a platinum catalyst in a quantity that affords a value of from 0.1 part by weight to 500 parts by weight of platinum metal atoms per 1,000,000 parts by weight of component (A), and (E) 0.0110 parts by weight of a particulate hydroxide or oxide of an alkali metal, or a particulate hydroxide or oxide of an alkaline earth metal.

The diorganopolysiloxane of component (A), which has at least two silicon-bonded alkenyl groups in each molecule, is the principal component used to form silicone rubber by means of crosslinking the present composition. Component (A) is a substantially linear diorganopolysiloxane or a linear diorganopolysiloxane with some branching represented by average unit formula

$$R_nSiO_{(4-n)/2},$$

where R is a monovalent hydrocarbon group exemplified by methyl, ethyl, propyl, butyl, pentyl, hexyl, or other alkyl groups; vinyl, allyl, propenyl, hexenyl, or other alkenyl groups; phenyl, tolyl, or other aryl groups; or 3,3,3-trifluoropropyl, 3,3,3-trichloropropyl, or other halogen-substituted monovalent hydrocarbon groups; the subscript n is a value of 1.9~2.1. The viscosity of this type of diorganopolysiloxane is typically in the range of from 100 mPa·s to 1,000,000 mPa·s.

Component (A) is exemplified by dimethylvinylsiloxy-endblocked dimethylpolysiloxane, dimethylvinylsiloxy-endblocked dimethylsiloxane-methylvinylsiloxane copolymers, dimethylvinylsiloxy-endblocked dimethylsiloxane-methylphenylsiloxane copolymers, dimethylvinylsiloxy-endblocked dimethylsiloxane-methylvinylsiloxane-methylphenylsiloxane copolymers, dimethylvinylsiloxy-endblocked dimethylsiloxane-diphenylsiloxane copolymers, dimethylvinylsiloxy-endblocked dimethylsiloxane-methylvinylsiloxane-diphenylsiloxane copolymers, dimethylvinylsiloxy-endblocked dimethylsiloxane-methyl(3,3,3-trifluoropropyl)

siloxane copolymers, and dimethylvinylsiloxy-endblocked dimethylsiloxane-methylvinylsiloxane-methyl(3,3,3-trifluoropropyl)siloxane copolymers.

Any inorganic filler known in the past as reinforcing fillers or semi-reinforcing fillers can be used as the inorganic filler of component (B), which is used for regulating the viscosity of the present composition and for imparting mechanical strength to the silicone rubber. The reinforcing fillers are exemplified by dry process silicas, wet process silicas, and hydrophobic silicas obtained by surface treating these silicas with, for example, organochlorosilane, organoalkoxysilane, organopolysiloxane, or organosilazane. Silica micropowders with an average particle size of 50 $\mu$m or less and a specific surface area by the BET method of at least 100 $m^2/g$ are preferred. The semi-reinforcing fillers are exemplified by diatomaceous earth, quartz powder, mica, aluminum oxide, titanium oxide, and materials obtained by treating them with organosilanes, organopolysiloxanes, fatty acids, and the like. Component (B) is compounded into the composition at 5~300 parts by weight per 100 parts by weight of component (A).

The organohydrogenpolysiloxane of component (C), which has at least two silicon-bonded hydrogen atoms in each molecule, acts as a cross-linking agent for the present composition. The organohydrogenpolysiloxane is exemplified by methylhydrogenpolysiloxane having both terminal ends blocked by trimethylsiloxy groups, dimethylsiloxane-methylhydrogensiloxane copolymers having both terminal ends blocked by trimethylsiloxy groups, dimethylsiloxane-methylhydrogensiloxane copolymers having both terminal ends blocked by dimethylhydrogensiloxy groups, and tetramethyltetrahydrogencyclotetrasiloxane. Component (C) is admixed in a quantity that affords a value of 0.3 to 5, and, preferably, in a quantity that affords a value of 0.3 to 3, for the molar ratio of silicon-bonded hydrogen atoms in component (C) to alkenyl groups in component (A). When the molar ratio is smaller than 0.3, the cross-linking density becomes too low, and the curing does not produce an elastic material, and when it exceeds five, due to a dehydrogenation reaction, bubbles may appear and the heat resistance of the cured rubber may decrease.

The platinum catalyst of component (D) promotes the addition reaction of the above-described component (A) and component (C). The platinum catalyst is exemplified by platinum micropowder, platinum black, chloroplatinic acid, alcohol-modified chloroplatinic acid, chloroplatinic acid/olefin complexes, and chloroplatinic acid/alkenylsiloxane complexes. Component (D) is admixed in a quantity of 0.1~500 parts by weight per 1,000,000 parts by weight of component (A).

Component (E) is a component imparting excellent high-temperature heat resistance to the present composition. Component (E) is selected from the group consisting of particulate hydroxides or oxides of alkali metals and particulate hydroxides or oxides of alkaline earth metals, for example, by oxides of lithium, sodium, potassium, calcium, strontium, or barium, and by their hydroxides, with calcium hydroxide and calcium oxide as most suitable from the standpoint of their milder basicity. The compounds of component (E) can be used singly or as mixtures of two or more. In addition, micropowders are helpful for efficiently dispersing them in the composition of the present invention. Component (E) is compounded into the present composition at 0.0~110 parts by weight, and preferably at 0.05~5 parts by weight, per 100 parts by weight of component (A). If the amount is less than 0.01 parts by weight, it does not impart sufficient heat resistance to the present composition and if it exceeds 10 parts by weight heat resistance is effected adversely.

The present composition comprises the above-described components (A)~(E). In addition to these components, however, various additives, for example, 1-ethynyl-1-cyclohexanol, 3-methyl-1-pentene-3-ol, benzotriazole, and other cure inhibitors; carbon black, red iron oxide, rare earth oxides, rare earth hydroxides, cerium silanolate, cerium fatty acid salts, and other heat resistance-improving agents; various flame retardants, internal mold release agents, pigments, and the like, can be added thereto so long as the purpose of the present invention is not impaired.

Various mixing devices used in the preparation of silicone rubber compositions, for example, a kneader mixer, a pressure kneader mixer, a ROSS mixer, or a continuous kneader extruder can be used as equipment for preparing the present composition.

Next, explanations are provided regarding the fluorocarbon resin-covered fixing roll of the present invention. The fluorocarbon resin-covered fixing roll of the present invention is obtained by providing a fluorocarbon resin layer on the peripheral surface of a silicone rubber layer formed out of a cured product of the above-mentioned silicone rubber composition. Iron, aluminum, and stainless steel are examples of the raw material for the fabrication of the roll shaft of the fixing roll of the present invention.

In addition, commercially available tubes of fluorocarbon resin or fluorocarbon resin coating agents can be used as the fluorocarbon resin. More specifically, tubes of fluorocarbon resins, such as polytetrafluoroethylene resins (PTFE), tetrafluoroethylene-perfluoroalkyl vinyl ether copolymer resins (PFA), fluorinated ethylene propylene copolymer resins (FEP), ethylene-tetrafluoroethylene copolymer resins (ETFE), polychlorotrifluoroethylene copolymer resins (PCTFE), polyvinylidene fluoride resins (PVDF), polyvinyl fluoride resins (PVF), ethylene chlorotrifluoroethylene copolymer resins (ECTFE), and tetrafluoroethylene-hexafluoropropylene copolymer resins (FEP); and fluorocarbon resin coating agents, such as polytetrafluoroethylene resin (PTFE) latex and DAI-EL latex (fluorocarbon resin latex produced by Daikin Industries, Ltd.) are suggested. The thickness of the fluorocarbon resin layer is typically not more than 0.1 mm, preferably, in the range of 0.1~50 $\mu$m, and the thickness of the silicone rubber layer is typically 0.1~50 mm, preferably, 0.1~30 mm.

Hereinbelow, the present invention is explained in a more specific manner by referring to working examples and comparative examples. In the working examples, the word "part" means "parts by weight," and the word "viscosity" refers to values measured at 25° C. In addition, the hardness and compression set of the silicone rubber were measured in the following manner.

Hardness

Silicone rubber sheets with a thickness of 6 mm were fabricated by heating the silicone rubber composition in a hot press at 120° C. for 10 minutes followed by heating at 200° C. for 4 hours. The hardness of the silicone rubber sheets was measured using a JIS Type A durometer as specified in JIS K 6249.

Compression Set

Test specimens of silicone rubber for compression set measurement with a thickness of 12.7 mm were fabricated by heating the silicone rubber composition in a hot press at 120° C. for 15 minutes followed by heating at 200° C. for 4 hours. The compression set of the silicone rubber test specimens was measured in accordance with the compression set test method stipulated in JIS K 6249. In addition, during the compression test, the compression ratio was 25%, the heat treatment temperature was 180° C., and the heat treatment time was 22 hours.

Heat Resistance

Silicone rubber sheets with a thickness of 6 mm were fabricated by heating the silicone rubber composition in a hot press at 120° C. for 10 minutes followed by heating at 200° C. for 4 hours. Fluorocarbon resin (fluororubber coating from Daikin Industries, Ltd.; trade name: DAI-EL Latex GLS-213) was uniformly spray-coated onto the surface of the silicone rubber sheets and baked at 350° C. for 30 minutes. Next, after cooling to room temperature, the fluorocarbon resin was peeled off. After that, the hardness of the thus obtained baked silicone rubber sheets was measured using a JIS Type A durometer as stipulated in JIS K 6249.

WORKING EXAMPLE 1

Ten parts fumed silica with a specific surface area of 110 m$^2$/g surface treated with dimethyldichlorosilane and 50 parts pulverized quartz micropowder with an average particle size of 3 μm were added to and mixed to homogeneity with 100 parts of a dimethylsiloxane-methylvinylsiloxane copolymer with a viscosity of 40,000 mPa·s having both terminal ends of the molecular chain blocked by trimethylsiloxy groups (content of vinyl groups: 0.32 wt%). Next, a uniform silicone rubber base compound was obtained by mixing the ingredients at 180° C. for 1 hour, followed by cooling the mixture to room temperature. A liquid silicone rubber composition was prepared by adding 0.3 parts calcium oxide micropowder, 2.5 parts of a methylhydrogensiloxane-dimethylsiloxane copolymer represented by average molecular formula

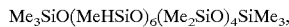

$Me_3SiO(MeHSiO)_6(Me_2SiO)_4SiMe_3$, 0.4 parts of a complex of chloroplatinic acid and divinyltetramethyldisiloxane (platinum content: 0.5 wt%), and 0.06 parts 1-ethynyl-1-cyclohexanol as a cure retardant to the base compound and mixing the ingredients to homogeneity. The hardness of the silicone rubber obtained by curing the composition was 22, and its compression set was 4%. In addition, the hardness of the silicone rubber after the heat resistance test was 20, thus undergoing practically no change after fluorocarbon resin coating and baking.

Next, after uniformly coating a commercial primer used for silicone rubber (from Dow Corning Toray Silicone Co., Ltd.; trade name: DY39-051A/B Primer) onto the peripheral surface of a cylindrical roll shaft (made of iron) with a diameter of 10 mm, the cylindrical roll shaft was placed inside the cavity of a mold used for fixing roll fabrication. Subsequently, the above-described liquid silicone rubber composition was charged thereto and cured at 120° C. for 30 minutes, followed by post-curing at 200° C. for 4 hours, producing a cylindrical roll shaft coated with silicone rubber with a thickness of 1.5 mm. Subsequently, after treating the silicone rubber surface with a commercially available primer used for silicone rubber, fluorocarbon resin (fluorocarbon resin coating from Daikin Industries, Ltd.; trade name: DAI-EL Latex GLS-213) was uniformly spray-coated onto its surface and baked at 350° C. for 30 minutes, to produce a fluorocarbon resin-covered fixing roll. The fluorocarbon resin-covered fixing roll was installed in an electrophotographic copier and 100,000 copies were continuously run off on A4 copy paper. The image was clearly copied.

COMPARATIVE EXAMPLE 1

A liquid silicone rubber composition was prepared in the same manner as in Working Example 1, but in this case omitting the calcium oxide micropowder added in Working Example 1. The hardness of the silicone rubber obtained by curing the composition was 21, and its compression set was 3%. The hardness of the silicone rubber after the heat resistance test was 10, with an 11-point drop in hardness as compared to the post-test hardness of the silicone rubber obtained in Working Example 1.

Next, the liquid silicone rubber composition was used to fabricate a fluorocarbon resin-covered fixing roll in the same manner as in Working Example 1. After installing the fixing roll in an electrophotographic copier and continuously running off 10,000 copies on A4 copy paper, irregularities could be seen in the way the image was copied. In addition, after continuously running off 10,000 copies, creasing appeared on the surface of the fixing roll.

WORKING EXAMPLE 2

Five parts fumed silica with a specific surface area of 110 m$^2$/g surface treated with dimethyldichlorosilane and 50 parts pulverized quartz micropowder with an average particle size of 3 μm were added to and mixed to homogeneity with 100 parts of a dimethylsiloxane-methylvinylsiloxane copolymer with a viscosity of 7,500 mPa·s having both terminal ends of the molecular chain blocked by dimethylvinylsiloxy groups (content of vinyl groups: 0.31 wt%). Next, a silicone rubber base compound was obtained by mixing these ingredients at 180° C. for 1 hour, followed by cooling the mixture to room temperature. A liquid silicone rubber composition was prepared by adding 0.5 parts calcium hydroxide micropowder, 8 parts of a dimethylsiloxane having both terminal ends of the molecular chain blocked by dimethylhydrogensiloxy groups, represented by formula

$HMe_2SiO(Me_2SiO)_{14}SiMe_2H$, 0.5 parts of a complex of chloroplatinic acid and divinyltetramethyldisiloxane (platinum content: 0.5 wt%), and 0.1 parts 1-ethynyl-1-cyclohexanol as a cure retardant to the base compound and mixing the ingredients to homogeneity. The hardness of the silicone rubber obtained by curing the composition was 10, and its compression set was 3%. In addition, the hardness of the silicone rubber after the heat resistance test was 11, undergoing practically no change after fluorocarbon resin coating and baking.

Next, an iron cylindrical roll shaft with a diameter of 10 mm, which had been surface treated with a commercial primer used for silicone rubber (from Dow Corning Toray Silicone Co., Ltd.; trade name: DY39-051 A/B Primer), and a fluorocarbon resin tube treated with a commercial primer used for silicone rubber (from Dow Coming Toray Silicone Co., Ltd.; trade name: DY39-067 Primer) on the outside, which was a tube made of tetrafluoroethylene-perfluoroalkyl vinyl ether copolymer resin with a thickness of 50 μm, whose interior surface had been treated with alkali, in a cavity of a mold used for the fabrication of fixing rolls. The above-described liquid silicone rubber composition was then injected into the cavity and cured at 100° C. for 30 minutes, after which the molding was removed from the mold and post-curing was conducted in an oven at 200° C. for 4 hours, to produce a fixing roll covered with a 3 mm thick coating of silicone rubber and with fluorocarbon resin. The fixing roll was installed in an electrophotographic copier and 100,000 copies were continuously run off on A4 copy paper. The image was clearly copied.

COMPARATIVE EXAMPLE 2

A liquid silicone rubber composition was prepared in the same manner as in Working Example 2, but in this case omitting the calcium hydroxide micropowder added in Working Example 2. The hardness of the silicone rubber obtained by curing the composition was 10, and its compression set was 3%. The hardness of the silicone rubber after the heat resistance test was 4, with a 6-point drop in hardness as compared to the post-test hardness of the silicone rubber obtained in Working Example 2.

Next, the liquid silicone rubber composition was used to fabricate a fluorocarbon resin-covered fixing roll in the same manner as in Working Example 2. After installing the fixing roll in an electrophotographic copier and continuously running off 20,000 copies on A4 copy paper, irregularities could be seen in the way the image was copied. In addition, creasing appeared on the surface of the fixing roll.

We claim:

1. A fluorocarbon resin-covered fixing roll comprising a shaft having cured thereon a silicone rubber layer comprising the reaction product of a liquid silicone rubber composition comprising
    (A) 100 parts by weight of a diorganopolysiloxane which has at least two silicon-bonded alkenyl groups in each molecule and is liquid at room temperature,
    (B) 5~300 parts by weight of an inorganic filler,
    (C) an organohydrogenpolysiloxane having at least two silicon-bonded hydrogen atoms in each molecule in a quantity that affords a value of from 0.3:1 to 5:1 for the ratio of the number of moles of silicon-bonded hydrogen atoms in the present component and silicon-bonded alkenyl groups in component (A),
    (D) a platinum catalyst in a quantity that affords a value of from 0.1 part by weight to 500 parts by weight of platinum metal atoms per 1,000,000 parts by weight of component (A), and
    (E) 0.01~10 parts by weight of a particulate hydroxide or oxide of an alkali metal, or a particulate hydroxide or oxide of an alkaline earth metal; and a fluorocarbon resin layer on the peripheral surface of the silicone rubber layer.

2. A fluorocarbon resin-covered fixing roll according to claim 1 in which component (E) is calcium oxide or calcium hydroxide.

3. A fluorocarbon resin-covered fixing roll according to claim 1 where the ratio of the number of moles of silicon-bonded hydrogen atoms in component (C) to the number moles of alkenyl groups in component (A) is 0.3:1 to 3:1.

4. A fluorocarbon resin-covered fixing roll according to claim 1 comprising 0.05~5 parts by weight of a particulate hydroxide or oxide of an alkali metal, or a particulate hydroxide or oxide of an alkaline earth metal.

* * * * *